United States Patent
Shacham et al.

(10) Patent No.: US 8,537,423 B2
(45) Date of Patent: Sep. 17, 2013

(54) METHOD AND SYSTEM FOR ENHANCING A DIGITAL HALFTONE REPRESENTATION FOR PRINTING

(75) Inventors: Omri Shacham, Mitzpe Ramon (IL); Jan Allebach, West Lafayette, IN (US); Doron Shaked, Tivon (IL); Carl Staelin, Haifa (IL); Mani Fischer, Haifa (IL); Puneet Goyal, San Ramon, CA (US); Madhur Gupta, Madison, WI (US); Tamar Kashti, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 13/007,013

(22) Filed: Jan. 14, 2011

(65) Prior Publication Data

US 2012/0182587 A1    Jul. 19, 2012

(51) Int. Cl.
   *H04N 1/405*    (2006.01)
(52) U.S. Cl.
   USPC ........................................ 358/3.04; 358/3.26
(58) Field of Classification Search
   USPC .................. 358/1.9, 2.1, 400, 406, 500, 504,
       358/3.26, 3.21, 3.01, 3.03–3.06, 3.09–3.12
   See application file for complete search history.

(56) References Cited

U.S. PATENT DOCUMENTS

| | | | |
|---|---|---|---|
| 6,266,157 B1 | 7/2001 | Fan et al. |
| 6,867,884 B1 | 3/2005 | Rozzi |
| 7,031,025 B1 | 4/2006 | He et al. |
| 7,085,013 B2 | 8/2006 | Yamakawa |
| 7,446,903 B2 | 11/2008 | Hagai et al. |
| 7,496,237 B1 | 2/2009 | Dominguez |
| 2009/0251736 A1 | 10/2009 | Kawamura |

OTHER PUBLICATIONS

Zhen He, Hierarchical Colorant-Based Direct Binary Search Halftoning, IEEE Transactions on Image Processing, vol. 19, No. 7, Jul. 2010. First published Mar. 15, 2010; current version published Jun. 16, 2010.

*Primary Examiner* — Thomas D Lee
*Assistant Examiner* — Stephen M Brinich (57) ABSTRACT

A method for predicting an appearance of a rendering by a printer of a digital halftone representation of a continuous-tone image includes calculating a predicted absorptance value of a dot of a rendered halftone of the digital halftone representation. The dot corresponds to a pixel of the digital halftone representation. The predicted absorptance value is based on a configuration of pixel values of pixels in an immediate neighborhood of the pixel, and on a weighted contribution of a pixel value of each pixel in an outer neighborhood of the pixel. The method may be incorporated into a halftoning technique. Relating computer program product and data processing system are also disclosed.

20 Claims, 6 Drawing Sheets

METHOD AND SYSTEM FOR ENHANCING A DIGITAL HALFTONE REPRESENTATION FOR PRINTING

BACKGROUND

A digitized representation of a continuous-tone image, where gray level or color of each pixel is represented by a continuum of values (e.g. between 0 and 1), may be rendered on a device, such as a printer, capable of producing a limited set of tone levels. Digital halftoning is a process for performing the rendering of the digitized representation with such a limited set. The digitized representation, referred to as a digital halftone or digital halftone representation, may include an array of pixels each having a value of each pixel indicating the tone level of ink or toner deposited by the printer on a corresponding location on a substrate or medium.

The output image produced by the halftoning process may be referred to as a rendered halftone. In the case of binary printing, a limited set of tone levels may represent the presence or absence of a printed dot. In the case of multi-level printing, the limited set of tone levels may include a limited set of dot sizes. In the case of polychromatic binary or multi-level printing, the halftoning process may be applied separately for each color of ink or toner. Halftoning may produce an acceptable image due to characteristics of the human visual system (HVS). The HVS may be modeled as applying a low-pass spatial filter to a perceived image. Thus, an unmagnified rendered halftone may be perceived by a human observer as a continuous-tone image.

The transfer of ink or toner from a reservoir to a printable medium or substrate (e.g. paper) may be a complex process. In particular, an electro-photographic (EP) printing process may include several electrostatic transfers of toner particles. For example, in an EP offset printing process, toner may be transferred from a storage container or reservoir to a latent image on a drum, from the drum to a transfer blanket, and from the transfer blanket to the printing medium. Each transfer may introduce distortion, blurring or other inaccuracies, such that the final printed image may be a perceptibly distorted version of the original digital image. The amount of distortion of a printed dot may be influenced by the presence or absence of neighboring dots. The amount of distortion may vary from printer to printer, and may vary over the lifetime of the printer due to, for example, printer component aging or replacement.

BRIEF DESCRIPTION OF THE DRAWINGS

Reference is made to the accompanying drawings, in which.

DETAILED DESCRIPTION

A EP halftoning model, in accordance with an embodiment of the invention, may be incorporated into a direct binary search (DBS) or other correction technique. Application of a correction technique may include adjusting a digital halftone that may represent a continuous-tone image (e.g. a digital image file) so that the similarity between a resulting rendered halftone and the continuous-tone image may be acceptable to human observer. The adjustment may include application of the EP halftoning model to the digital halftone so as to predict the appearance of the rendered halftone. The digital halftone may be modified as needed so as to improve or optimize the similarity of the resulting predicted rendered halftone to the continuous-tone image. Application of an HVS model to the predicted rendered halftone may assist in evaluating the significations to a human observer of any modifications. Application of such a correction technique may enable printing a rendered halftone that may be perceptibly similar or identical to a continuous-tone representation of the image. A printer system may be operated so as to generate the model, and may then utilize the model in the generation of a digital halftone.

Generation of the EP halftoning model for a printer may include calibrating the printer. The calibration process may include analysis of a learning set of rendered halftones, as printed by that printer, and that include printed arrays of dots. Each printed dot array may be a rendering of a known pixel pattern of a digital halftone. The pixel patterns of the learning set may include various configurations of a smaller pattern of pixels (e.g. a 3×3 square pixel array), and of a larger pattern (e.g. a 5×5 square pixel array).

By analysis of the learning set, an EP halftoning model may be generated. The generated EP halftoning model may be applied to predict the appearance of a rendered halftone result using an EP halftoning process by that printer. Pixels of each pixel pattern of the digital halftone may be assigned one of the available tone levels. Each pixel pattern may be replicated a predetermined number of times.

The printed dot arrays of the rendered halftone may be scanned or otherwise digitized. The absorptance of a selected region of each printed dot pattern may be measured or calculated from pixel values of the digitized image. Each selected region may correspond to a predicted location of a central dot of each dot pattern. Depending on the specific pixel pattern, this central dot may or may not correspond to an intentionally printed dot.

A darker surface in the selected regions has a greater absorptance than a lighter surface. The measured absorptance of the central dot may vary among the printed renderings of replications of a single digital pixel pattern. Therefore, an average value of the absorptance, and a statistic of variation, such as a standard deviation, a variance, a first to third interquartile range, or a 5%-95% range, may be calculated from the replications.

Analysis of the measurements may result in generation of an EP halftoning model of printer-introduced distortion or blurring of a rendered halftone based on a known digital halftone. The analysis model may predict the absorptance of a selected printed dot of a rendered halftone which may correspond to a pixel of a digital halftone. The prediction may be based on values of pixels that correspond to dots in a neighborhood of the selected printed dot. Contributions of an immediate neighborhood of the selected dot (e.g. a 3×3 pixel array centered on the pixel that corresponds to the selected dot) and an outer neighborhood (e.g. a 5×5 pixel array centered on the pixel that corresponds to the selected dot, or a single-pixel-wide band of pixels that surrounds the immediate neighborhood of 3×3 pixels) may be calculated differently. For example, the contribution of the immediate neighborhood may include a value based on the pattern of pixel values in the immediate neighborhood. The contribution of the outer neighborhood may include a sum of the value of each pixel of the outer neighborhood multiplied by a weight assigned to that pixel. The assigned weights, in turn, may also depend on the pattern of pixel values in the immediate neighborhood. The calculated immediate neighborhood contributions and assigned weights may be derived from statistical analysis of the digitized rendered halftones and the digital halftones of the learning. For example, the analysis may include application of a least squares method to determine optimal assigned weights.

The digital halftones of the learning set may include a sufficient variety of pixel configurations so as to effectively model the printing. Printing may not be a rotationally or reflectively symmetric process. For example, in a printing process there may be fixed directions of motion and rotation for the printer components and medium, and printer components may not be arranged symmetrically. Results obtained from printing and analyzing a specific pattern may thus not be equivalent to results obtained from printing and analyzing other patterns that are equivalent to a rotation or reflection of the specific pattern. Therefore, results of analysis of one pattern may not be directly applicable to a rotation or reflection of that pattern. Therefore, analysis may be performed separately for all patterns. However, analysis of results may empirically demonstrate valid or acceptable equivalent results for rotations or reflections of a pattern. In such a case, generation of the EP halftoning model may take into consideration such symmetry equivalence to enable a reduction in the number of patterns that are analyzed.

To render a digital pattern of n pixels with m available tone levels, the number of possible pattern configurations is equal to $m^n$. When each pattern is replicated r times, the total number of patterns to be rendered is $rm^n$. When the number of pixels or the number of available tone levels is large (e.g. n>9 or m>2), it may be advantageous to include in a learning set only a sample of all possible patterns.

For binary printing (m=2), it may be practical to include in the learning set all 512 possible patterns of a 3×3 pixel pattern (even when the patterns are repeated). However, it may not be practical to include all possible configurations of a 5×5 pixel pattern. Therefore, a learning set might only include a sample of all possible 5×5 configurations.

Figure 1:
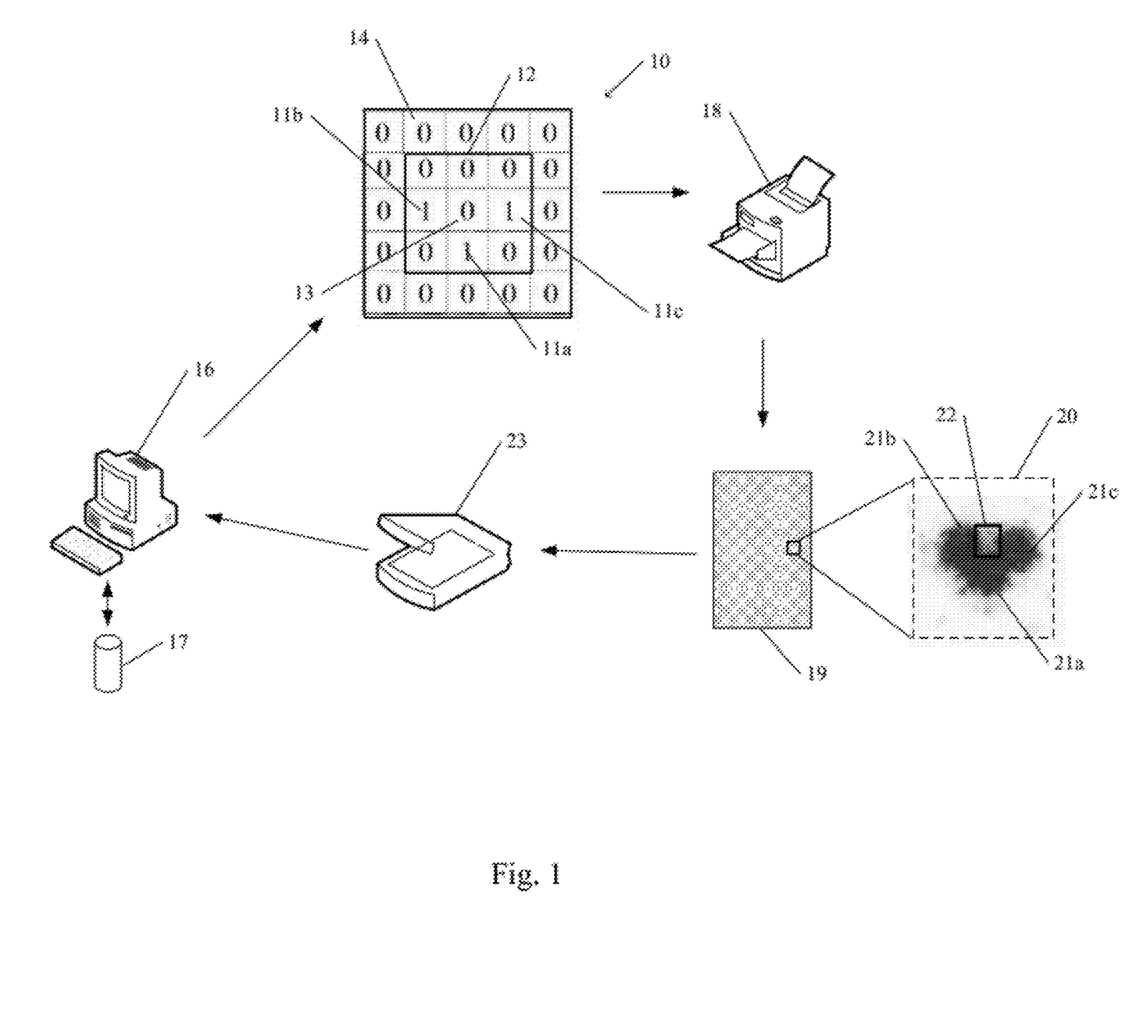
FIG. 1 schematically illustrates a system in accordance with an embodiment of the invention.

FIG. 1 schematically illustrates a system for generation and application of an EP halftoning model, in accordance with an embodiment of the invention. A digital halftone 10 (an exemplary 5×5 pixel section is shown) may include a neighborhood of central pixel 13. The neighborhood of central pixel 13 may include immediate neighborhood 12 (e.g. 3×3 pixels in a square pattern) surrounded by outer neighborhood 14 (with 16 pixels forming a perimeter of a square). Digital halftone 10 may be created by processor 16 on the basis of a continuous-tone image, or on the basis of data stored in data storage device 17.

Data storage device 17 may be incorporated into, or external to, processor 16. Data storage device 17 may include stored instructions for operation of processor 16. Data storage device 17 may be configured to store input to, and results of, various processes executed by processor 16. Data storage device 17 may store data associated with an EP halftoning model in accordance with one or more embodiments of the invention.

Data storage device 17 may include a plurality of data storage devices, each accessible by processor 16. Functionality of processor 16 may be distributed among a plurality of separate or intercommunicating processing devices. Some or all of the functionality of processor 16 may be incorporated into a processor that is a component of, or associated with, printer 18.

Digital halftone 10 may be loaded into printer 18 for printing. Printer 18 may include a printing device capable of printing a halftone image. Printer 18 may print a rendering of digital halftone 10 on a printing medium, e.g. printed sheet 19. Printed sheet 19 may include a pattern of dots of ink or toner deposited on a substrate such as a sheet of paper. Printed sheet 19 may include a printed rendering of digital halftone 10 in the form of printed dot pattern 20 (shown magnified). For example, dots 21a-21c of printed dot pattern 20 may represent printed renderings of pixels 11a-11b, respectively, of digital halftone 10. Region 22 of printed dot pattern 20 may correspond to central pixel 13 of digital halftone 10.

Scanner 23 may generate a digitized image of a surface, such as printed sheet 19. A digitized image generated by scanner 23 may be available to processor 16. A digitized image may include an array of pixels, each pixel representing a gray level or color of a scanned area of the surface. In generating a EP halftoning model, a digitized image of a printed rendering of a learning set from scanner 23, and digital halftone 10 of the learning set, may be accessed by processor 16. Processor 16 may be configured to apply an image processing technique to the digitized image. An image processing technique may include normalizing the image such that the brightest pixel values represent a substrate (e.g. white paper) on which no ink was deposited, and the darkest represent maximum deposition of ink. An image processing technique may also include compensation for any blurring introduce by scanner 23 (e.g. by compensating for a scanner media transfer function). Processor 16 may be configured to analyze the digitized image in light of digital halftone 10 so as to generate an appropriate EP halftoning model for printer 18. When analyzing the learning set, scanning may be performed at a higher resolution than printing. Thus, a plurality of pixels of the scanned pixel representation may cover a single dot of printed dot pattern 20.

One or both of printer 18 and scanner 23 may be a peripheral device connected to processor 16. Processor 16 may have access to both digital halftone 10 and a digitized image of printed sheet 19. In another implementation, printer 18 and scanner 23 may be associated with separate processors (collectively referred to herein as processor 16). These separate processors may transfer data from one to another, e.g. via a network or other connection, or via physical transfer of a data storage medium.

Binary printing pixel values may be limited to either 1 or 0. A pixel value of 1 may correspond to depositing an ink dot, and a value of 0 may correspond to no deposit of ink. To binary print a 3×3 pixel matrix, there are $2^9$, or 512, possible configurations. In accordance with an embodiment of the invention, a learning set may include all of the 3×3 configurations. Each pixel pattern of digital halftone 10 may be replicated, and thus printed repeatedly, multiple times. The number of replications of each pixel pattern may be selected such that analysis of the learning set may enable a statistically reliable or significant measured absorptance. In accordance with an embodiment of the invention, a learning set may include 98 replications of each 3×3 pixel configuration. A single sheet of paper (e.g. A4 or 8.5 inch×11 inch) may have 512×98 dot patterns printed thereon.

Digital halftone 10 may include pixels to be rendered as fiducial marks. Fiducial marks may be printed around each printed dot pattern. The fiducial marks may be printed at a sufficient distance from the dot pattern to ensure that any effect on the appearance of the dot pattern may be minimal or negligible. Fiducial marks may facilitate identification of a region of the dot pattern (e.g. a central dot) that was selected for absorptance analysis.

Figure 2:
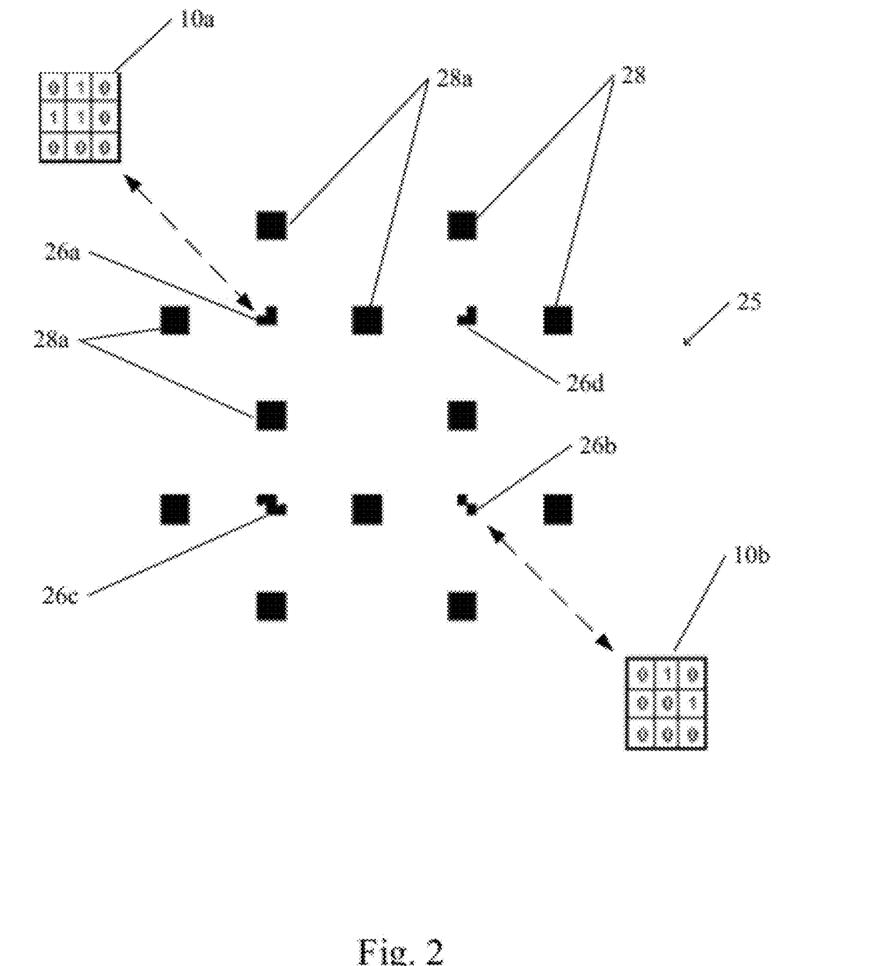
FIG. 2 illustrates a pattern of pixels of a learning set in accordance with an embodiment of the invention.

FIG. 2 illustrates a pattern of pixels of a learning set for generation of an EP halftoning model, in accordance with an embodiment of the invention. Pattern 25 may represent an ideal rendering of a digital halftone in the form of dot patterns 26a-26d. Each dot pattern of dot patterns 26a-26d is based on a corresponding digital pixel pattern, and may represent an ideal rendering in the absence of printer distortion or blurring. Dot pattern 26a corresponds to digital halftone 10a, and dot pattern 26b corresponds to digital halftone 10b.

Each dot pattern 26a-26d may be located within a pattern of four fiducial marks 28. For example, desired dot pattern 26a is located at the center of fiducial marks 28a. Distances between fiducial marks 28 and dot patterns may be sufficient to minimize an effect of fiducial marks 28 on the dot patterns. In accordance with an embodiment of the invention, a fiducial mark 28 may be located 9 pixels from the center of a nearest dot pattern. Each dot pattern may be located at least 19 pixels from its nearest neighboring dot pattern.

For example, analysis of rendered 3×3 dot patterns may be applied to predict the results of printing a similar 3×3 pixel pattern. A measured average absorptance value of a central printed dot of a 3×3 rendered pixel pattern may be used to predict the absorptance at the center of a printed rendering of a similar pixel pattern. The next band of pixels outside the 3×3 pattern, forming a 5×5 pattern may also significantly influence the absorptance of the central printed dot. A more accurate prediction of the absorptance may include analysis of printed renderings of 5×5 patterns of pixels.

For a 5×5 array of pixels, the number of possible patterns is much greater than the number of possible 3×3 patterns. Binary printing of a 5×5 array may have $2^{25}$ possible patterns of pixels. Printing of all 5×5 patterns multiple times and analyzing the printed dot patterns may not be practical or acceptable, in view of the large number of patterns. A subset of the complete set of possible patterns may be selected for printing and analysis. The subset may be selected so as to enable printing, scanning, and analysis of an acceptable number of printed sheets.

A 5×5 pattern of pixels may be considered to consist of a 3×3-pixel immediate neighborhood of a central pixel, surrounded by an outer neighborhood of 16 pixels. Binary printing may include 512 different possible configurations of the immediate neighborhood, and $2^{16}$ (65,536) different configurations of pixels in the outer neighborhood. In accordance with an embodiment of the invention, a subset of the possible outer neighborhood patterns may be selected. Each of the selected outer neighborhood patterns may be combined with each of the immediate neighborhood patterns to form a selected subset of (e.g. 5×5 pixel pattern) configurations. The representative sample of outer neighborhood configurations may be selected such that at least one configuration with k dots, $k \in \{0, 1, \ldots, 16\}$, in the 5×5 outer neighborhood is selected.

In accordance with an embodiment of the invention, a representative sample of 160 patterns of outer neighborhood pixels may be selected. Thus, for binary printing in combination with all of the immediate neighborhood configurations, a total subset of 160×512=81920 of 5×5 configurations may be selected. Each of the selected configurations may be replicated a predetermined number of times (e.g. 100).

In accordance with an embodiment of the invention, a printed page may include a 2×2 arrangement of 4 patches. The pixel pattern of each patch may include 50 replications of each of 26 different immediate neighborhood patterns, with each immediate neighborhood being combined with each of 80 different outer neighborhoods. Thus, each patch pattern may include 50×26×80=104,000 dot patterns. Typically, a single patch pattern is replicated in two adjacent patches. Two other patches on the page typically include the same 26 different immediate neighborhood patterns, combined with each of another 80 different outer neighborhoods (altogether 160 outer neighborhood patterns). In this case, 100 multiples of printed renderings of 81920 different printed patterns may be included in 20 printed pages. Each printed page may include fiducial marks around each printed dot pattern.

Scanned printed dot patterns may be analyzed so as to generate an EP halftoning model.

Figure 3:
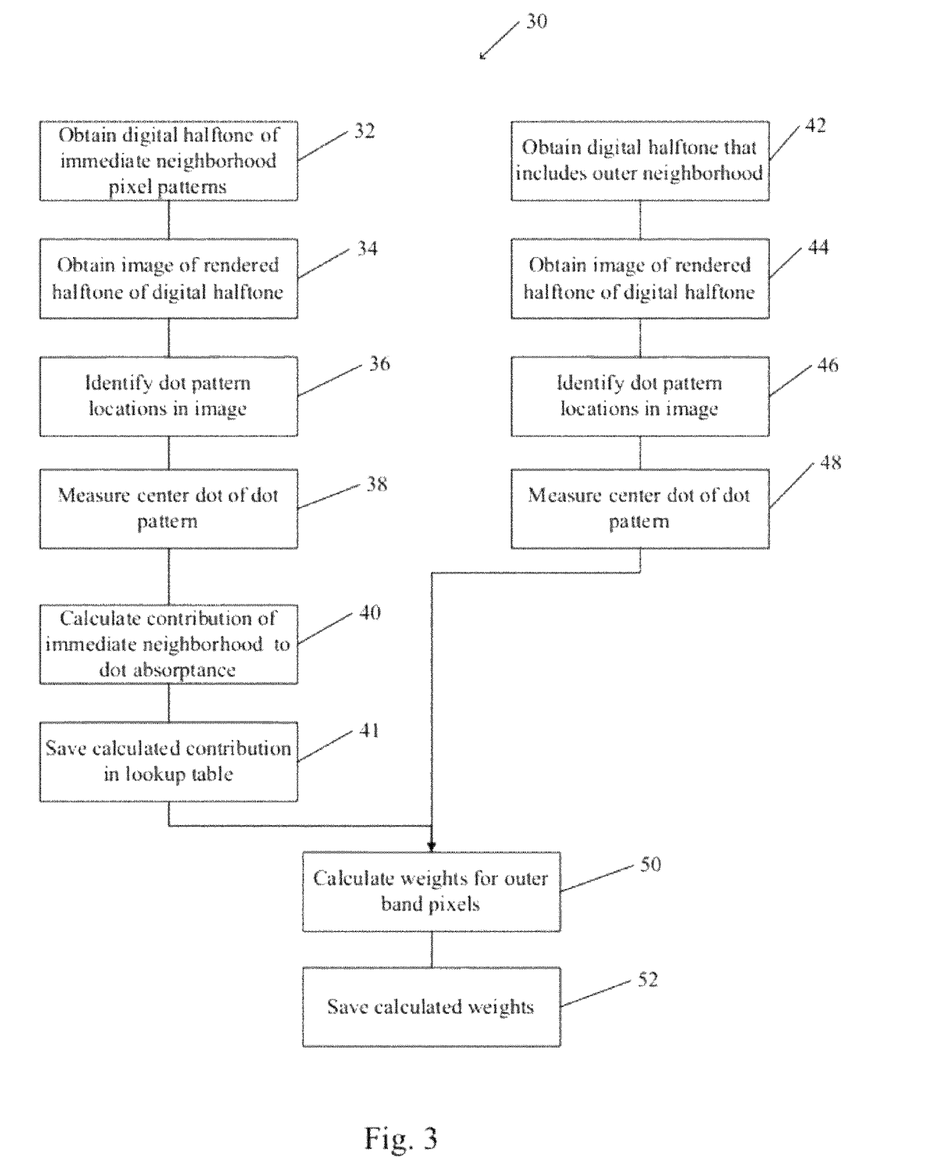
FIG. 3 illustrates a flowchart for a process in accordance with an embodiment of the invention.

FIG. 3 is a flowchart of a method for generating an EP halftoning model from a digitized rendered halftone of a digital halftone, in accordance with an embodiment of the invention. It should be understood with regard to this flowchart, and with regard to all flowcharts herein described, that the division of the method into discrete steps is for convenience and clarity only. Alternative division of the method into steps is possible with equivalent results, and all such equivalent divisions into should be understood as included within the scope of embodiments of the invention. The order of the steps illustrated in the flowcharts is selected for the sake of convenience and of clarity. Steps of the method may be performed concurrently or in an alternative order with equivalent results unless specifically identified otherwise. Such reordering of the steps should be understood as included within the scope of embodiments of the invention.

EP halftoning model generation method 30 may include obtaining digitized images of an immediate neighborhood (e.g. a 3×3 array) and an immediate neighborhood with an outer neighborhood (e.g. 5×5 array) of printed renderings of a known digital halftone on a specific printer. An image processing technique may be applied as needed to a digital image to compensate for any blurring introduced by a digitizing process (e.g. by compensating for a scanner media transfer function). Analysis of the digitized images may generate an EP halftoning model for the specific printer.

The immediate neighborhood digital pixel patterns of the digital halftone may be obtained (step 32). For example, a stored digital halftone in the form of an image file may be opened. A digitized image of a rendered halftone (e.g. a printed sheet of paper) of the patterns of the digital halftone may be obtained (step 34). For example, scanning the printed sheet by a digital scanner may create a digital image representation of printed dot patterns.

The resolution of the scanner image may be greater than the printer resolution. Thus, a single printed dot, even in the absence of printer-introduced distortion or blurring, may represent several pixels of the scanner image. For example, the dots may be printed at about 800 dots per inch (dpi) and scanned at about 2400 dpi, such that each dot may cover approximately a 3×3-pixel region of the digitized image.

EP halftoning model generation method 30 may include analyzing the images of dot patterns in light of the corresponding pixel patterns. A processor may be configured to perform the analysis. The analysis may include measurement of various properties of the dot patterns. In order for such measurements to be made, a processor may identify the locations of the dot patterns (step 36). A binarization method may be applied to the image to create a binary mask image. A centroid calculation technique may be applied to the binary mask image to determine the centroids of image pixels that may correspond to fiducial marks. Relative locations of the dot patterns relative to the fiducial marks may be predetermined. The predetermined relative locations may enable identification of image pixels that represent a central dot of each printed 3×3 dot pattern.

Measurements may be made on pixels that represent the central dot of each printed 3×3 dot pattern (step 38). Measurements may be calibrated to units of absorptance, with values ranging from about zero (completely reflecting) to about one (completely absorbing). In practice, ink may not be completely absorbing, and a printing substrate may not be completely white or reflective. Therefore, a gray-balancing technique may be applied to the image. A gray-balancing technique may adjust each pixel value such that a maximum brightness (zero absorptance) may correspond to a surface of the printing substrate on which no ink has been deposited. A minimum brightness may then correspond to a maximum detected density of deposited ink on the printing substrate (absorptance of about one). A gray-balancing technique may be separately applied to each color for polychromatic printing detected by the scanner (e.g. red, green, or blue), or to each color component of the ink (e.g. cyan, magenta, or yellow).

The mean absorptance of pixels that correspond to the central dot may be calculated. If the scan resolution is s times greater than the printer resolution, the calculation may be performed for s×s pixels surrounding the identified center of each dot pattern image. If the dot pattern is replicated multiple times, an average of the absorptance for all of the replications may be calculated.

The calculated average dot absorptance for the central dot of a particular dot pattern may be used to predict an immediate neighbor contribution to dot absorptance as part of an EP halftoning model (step 40). Typically, a value of a statistic of variation of the absorptance of the centrally dot, such as the standard deviation, may also be calculated (e.g. for use in calculating an evaluation criterion, as described below).

The average dot absorptance and the statistic of variation may be stored in a retrievable manner. For example, each of the various pixel pattern configurations (e.g. 512 3×3 patterns for binary printing) may be assigned an index. The average dot absorptance for the central dot of the corresponding dot pattern may then be stored in a lookup table (LUT) or database that is indexed to the various 3×3-pixel pattern configurations (step 41). In another implementation, the average dot absorptance may be stored in the form of an appropriate function of the values of pixels in the immediate neighborhood.

Similarly, a digital halftone including selected 5×5 pixel configurations may be obtained (step 42). The selected 5×5 digital pixel pattern configurations may represent a subset of all possible 5×5 digital pixel configurations. An image of a rendered halftone of the digital halftone, with printed renderings of the selected configurations, may also be obtained (step 44). Locations of the 5×5 dot patterns on the obtained image may be identified (step 46), e.g. in relation to calculated centroids of images of fiducial marks. The regions of the image that represent the central dot of each 5×5 dot pattern may be identified, and measurements of the mean and standard deviation of the absorptance of the central dot may be performed (step 48).

A linear model for representing a contribution of each pixel dot in the outer neighborhood to the absorptance of the central dot may be constructed. In one embodiment of method 30 in accordance with the invention, the absorptance of the central dot may be calculated by adding the contribution to the average absorptance of a 3×3-pixel immediate neighborhood to a sum of the weighted contribution of each pixel in an outer neighborhood. Typically, the weights may be specific to a particular immediate neighborhood configuration, and each pixel of the (e.g. 16) pixels in the outer neighborhood may be assigned a unique weight.

For example, a weight α of a central pixel may be represented by $$\alpha = \alpha_i + \sum_{k=1}^{n} \Psi_k w_{i,k}$$

where i is an index of a particular immediate neighborhood configuration (e.g. from 1 to 512), and $\alpha_i$ represents the average central dot absorptance for that immediate neighborhood configuration (e.g. from the LUT generated in step 40). In the summation, k is an index that represents each of the n (e.g. 16) pixels in the outer neighborhood. The value of each pixel of the outer neighborhood is represented by $\Psi_k$ (with a value of 0 or 1 for binary printing). A weight $w_{i,k}$ determines the contribution of each pixel k of the outer neighborhood to the absorptance of the central dot, given the immediate-neighborhood pattern whose index is i. Alternatively, the equation may also include an additive term, representing an additive offset value, based on the immediate neighborhood configuration.

Weights $w_{i,k}$ may be calculated (step 50) using the learning set of measured central pixel absorptance for the 5×5 dot pattern images, the obtained pixel patterns, and the average central dot absorptance for the corresponding immediate neighborhood pattern. A least squares, or any similar data-reduction technique for calculating the value of a coefficient from measurement data may be applied. The calculated weights may be saved in an indexed fashion for access at a later time (step 52). The calculated weights may be saved in an appropriately configured database or LUT. An analogous method may be used to calculate weights for predicting the influence of the 3×3 inner neighborhood dot pattern and the 5×5 outer neighborhood dot configuration on the absorptance of the center pixel.

Figure 4:
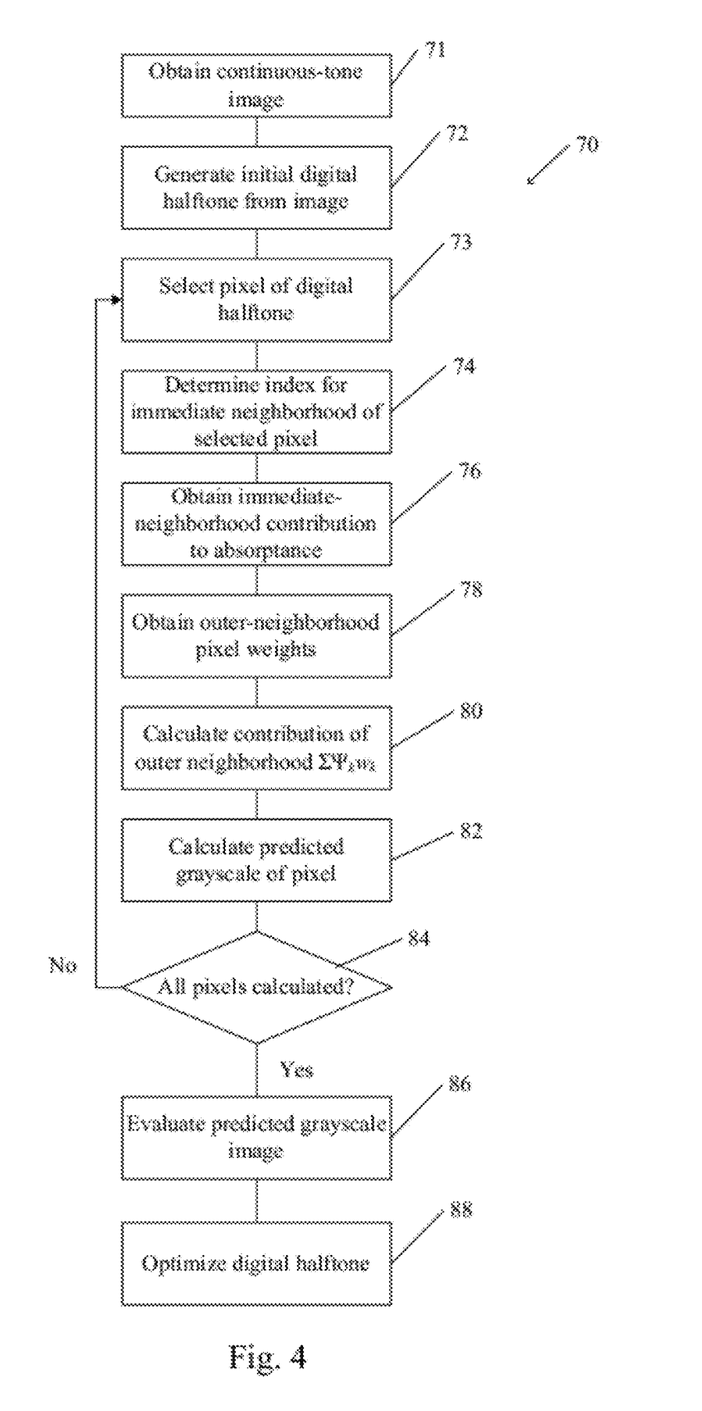
FIG. 4 illustrates a flowchart in accordance with an embodiment of the invention.
Figure 5:
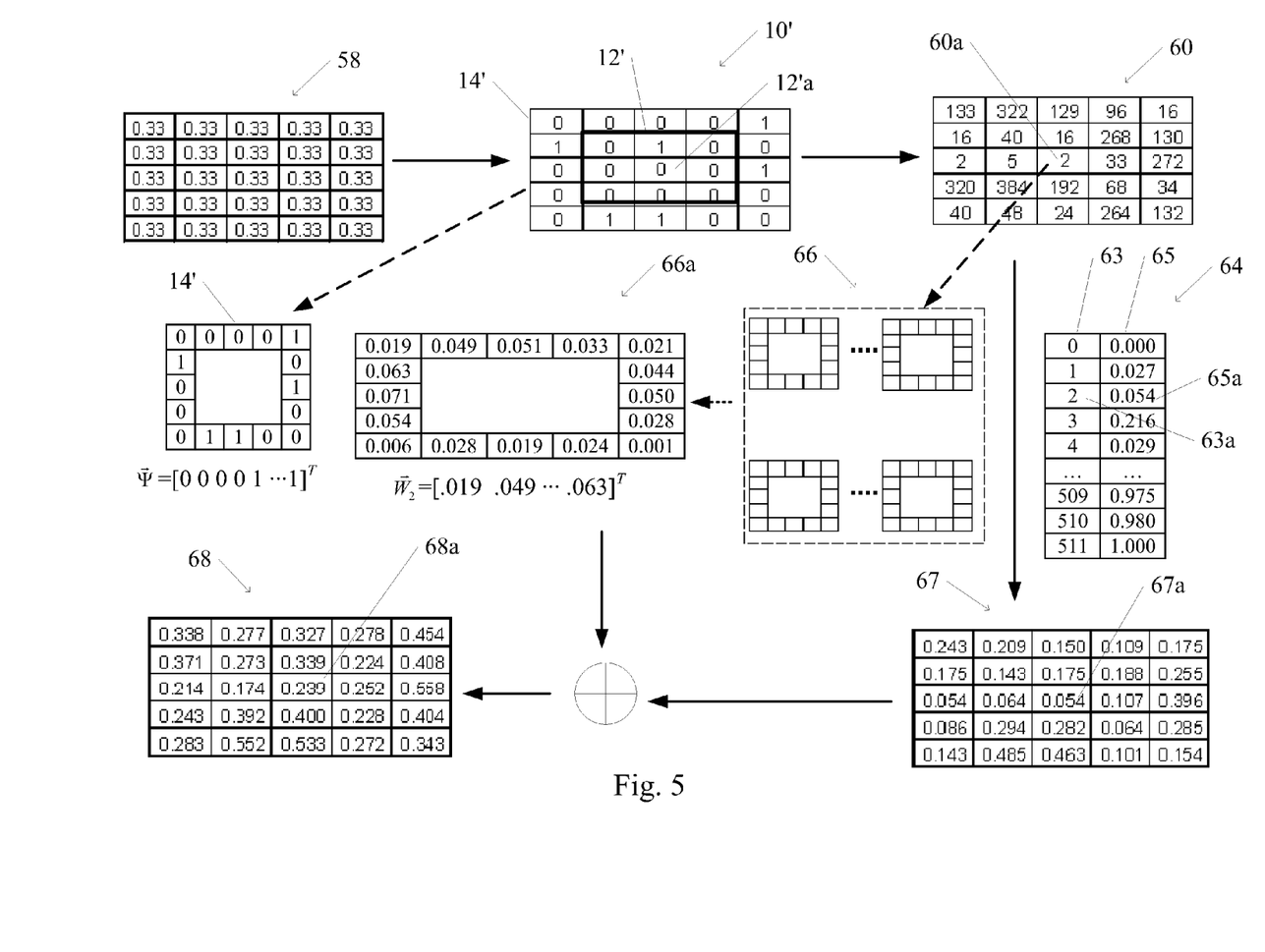
FIG. 5 schematically illustrates a process in accordance with an embodiment of the invention.

FIG. 4 is a flowchart of method 70 for applying an EP halftoning model to prepare a digital halftone of an image, in accordance with embodiments of the invention. Iterative halftoning method 70 may include applying an EP halftoning model to predict the absorptance pattern resulting from printing the digital halftone printer for which an EP halftoning model was generated. FIG. 5 schematically illustrates a process applying an EP halftoning model to predict grayscale levels of a rendered halftone, in accordance with an embodiment of the invention. The following discussion of method 70 references FIGS. 4-5.

A continuous-tone image 58, (which may be in the form of a digital image file with pixels having continuous values), to be printed in the form of a rendered halftone, may be obtained (step 71). A processor associated with the printer may generate initial digital halftone 10, representing continuous-tone image 58 (step 72). Initial digital halftone 10 may be prepared in accordance with a halftoning algorithm. For example, initial digital halftone 10 may be prepared by application of a random threshold to continuous-tone image 58.

A pixel of initial digital halftone 10', for example, digital halftone pixel 12'a, may be selected (step 73). A neighborhood (or other immediate neighborhood) of selected digital halftone pixel 12'a, e.g. immediate neighborhood 12', may be identified. Pixels of digital halftone 10' may be assigned an index based on their respective immediate neighborhood, as illustrated by index map 60. An index that identifies the immediate neighborhood about selected digital halftone pixel 12'a, selected pixel index 60a, may be identified (step 74).

LUT 64 may include information that may correlate each neighborhood index in index list 63 with a corresponding dot absorptance value in absorptance list 65. A dot absorptance value may correspond to a predicted contribution of an immediate neighborhood of a pixel of initial digital halftone 10' to a dot that is a printed rendering of that pixel. Index 63a of index list 63 may correspond to selected pixel index 60a. Selecting index 63a of index list 63 may result in selection of absorptance value 65a from absorptance list 65 of LUT 64 (step 76). The value of absorptance value 65a may be used in predicting an absorptance of a printed rendering of selected digital halftone pixel 12'a. For example, absorptance value 65a may be included in immediate neighborhood contribution map 67 as pixel 67a.

The contribution of outer neighborhood 14' may also be calculated. A selected outer neighborhood pixel weight vector 66a), corresponding to selected pixel index 60, may be selected from pixel weight vector database 66 (step 78). Selected outer neighborhood pixel weight vector 66a may include n weights (e.g. 16), each weight corresponding to a pixel of the (e.g. 5×5-pixel) outer neighborhood. In one implementation, an outer neighborhood pixel weight vector may also include an additive offset term (for a total of n+1 components; e.g. 17 for a 5×5 pixel outer neighborhood).

Outer neighborhood 14' surrounding immediate neighborhood 12' of selected pixel 12'a may be identified in initial digital halftone 10'. The pixel values of outer neighborhood 14' may be represented in the form of a pixel vector (e.g. $\vec{\Psi}$). The value of each pixel of outer neighborhood 14' may then be multiplied by the corresponding weight for that pixel, and the products added (e.g. $\vec{\Psi} \cdot \vec{w}_i$). The resulting sum may be a calculated contribution of outer neighborhood 14' to a predicted absorptance of a printed rendering of selected digital halftone pixel 12'a (step 80).

The sum calculated in step 80 and selected absorptance value 65a obtained in step 76 (and corresponding to pixel 67a of immediate neighborhood contribution map 67) may be added. The sum, absorptance value 68a, may represent the predicted absorptance, or grayscale, corresponding to selected pixel 12'a (step 82).

The procedure of steps 73 through 82 may be repeated for a selected region of pixels of digital halftone 10' (step 84). For example, pixels of a selected region of digital halftone 10' may be selected. The selected region may be sufficiently large to enable calculation of an evaluation criterion. In one embodiment in accordance with the invention, the procedure may be repeated for all pixels of digital halftone 10'.

Repeating the procedure for the selected region pixels of digital halftone 10' may result in a predicted rendered halftone 68.

Predicted rendered halftone 68 may be evaluated in light of an evaluation criterion, or error metric, that may indicate the similarity of predicted rendered halftone 68 to continuous-tone image 58 (step 86). Calculation of an error metric may include calculation of a difference image by subtracting one of continuous-tone image 58 and predicted rendered halftone 68 from the other.

An error metric may include a function of the difference image. An error function may include application of an HVS-based filter so as to determine the perceptibility of any differences. A total squared error may be calculated by integration or summation of a function of the square of the difference image over the image surface (or over a region of the image surface). The calculation may be formulated in terms of calculated autocorrelation and cross-correlation functions. An evaluation criterion may also include a term based on a statistic of variation, such as standard deviation, associated with pixels of predicted rendered halftone 68. The evaluation criterion may penalize local digital halftone configurations that generate unstable, widely varying, results.

An optimization method may be applied (step 88) to modify digital halftone. Pixel values of initial digital halftone 10' may be modified to yield an improved predicted rendered halftone 68 in accordance with the evaluation criterion.

Figure 6:
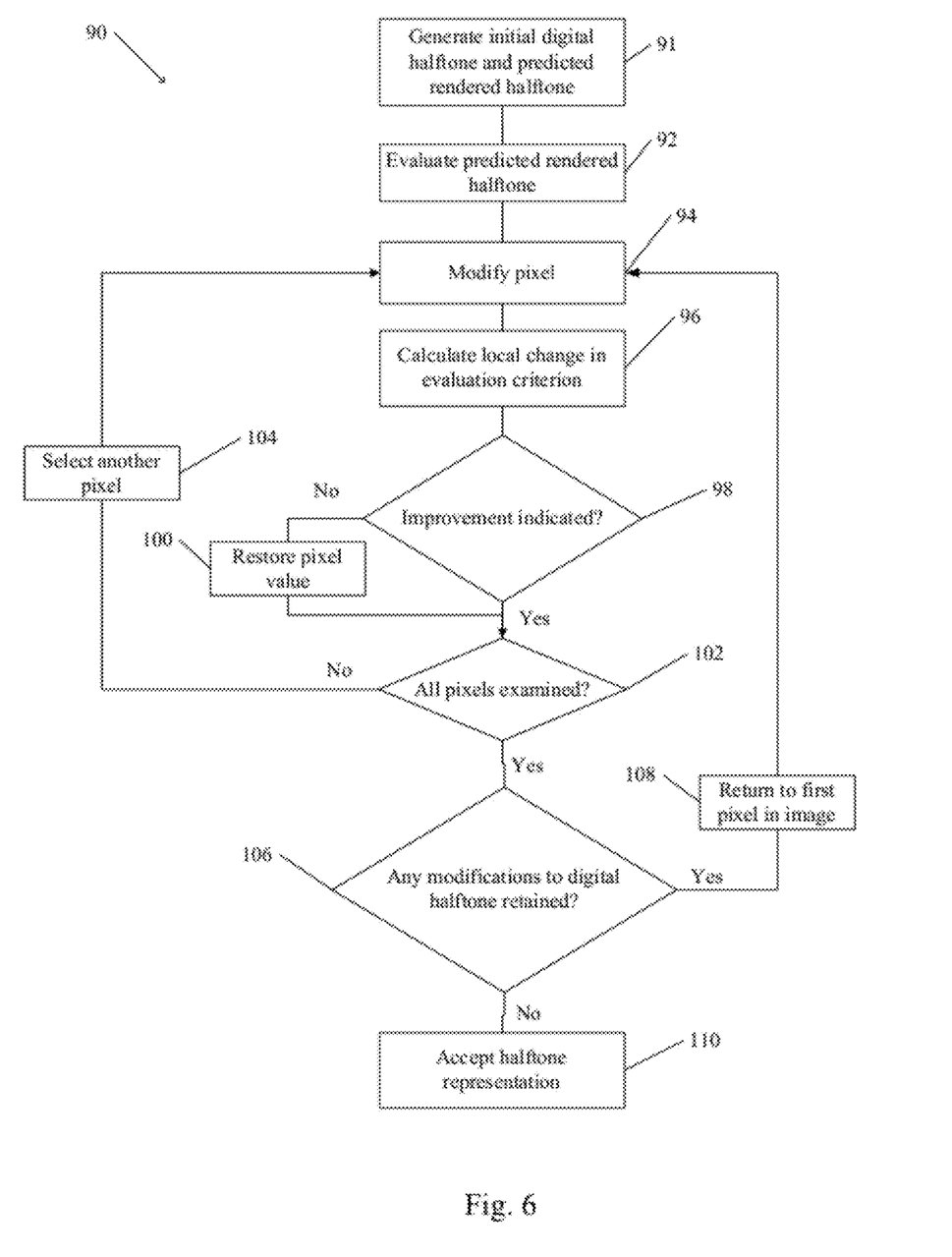
FIG. 6 illustrates a flowchart in accordance with an embodiment of the invention.

FIG. 6 is a flowchart of method 90 for digital halftone optimization in accordance with an embodiment of the invention. As part of a DBS technique utilizing an EP halftoning model, in accordance with an embodiment of the invention, digital-halftone optimization method 90 may be performed on a local (e.g. 5×5-pixel) region of initial digital halftone 10'.

Initial digital halftone 10' of continuous-tone image 58, and a predicted rendered halftone 68, may be generated (step 91). Predicted rendered halftone 68 may be evaluated in accordance with evaluation criteria (step 92).

A pixel of initial digital halftone 10' may be selected and modified (step 94). The value may be changed from an initial value of 0 to 1, or from an initial value of 1 to 0 when using binary printing.

The effect of the change in the value of the evaluation criterion may be calculated (step 96). Calculation of the change may include application of an efficient evaluation technique. Step 96 may include recalculating a predicted rendered halftone 68 (steps 73 through 84 of FIG. 4) for those pixels affected by the modification of the selected pixel, or a wider region. Calculation of the change may include recalculating the value of the evaluation criterion after modification of the pixel, and comparing the result to the value of the evaluation criterion before the modification.

A change in the value of the evaluation criterion due of modification of one pixel in binary printing may be expressible in terms of pre-calculated values and a limited number of simple (scalar) arithmetic operations. The pre-calculated values may be temporarily or permanently stored in lookup tables. A change in the value of the evaluation criterion may indicate whether the change results in a predicted rendered halftone 68 that is more similar or less similar to continuous-tone image 58.

The change $\Delta\Phi$ due to modifying a pixel at coordinates $[m_0, n_0]$ in an evaluation criterion in the form of error function $\Phi$, may be expressed as:

$$\Delta\Phi = \sum_{i=-2}^{2}\sum_{j=-2}^{2}\sum_{k=-2}^{2}\sum_{l=-2}^{2} \alpha_{i,j}\alpha_{k,l}c_{\tilde{p}\tilde{p}}[i-k, j-l] +$$

$$2\sum_{i=-2}^{2}\sum_{j=-2}^{2} \alpha_{i,j}c_{\tilde{p}\tilde{e}}[m_0+i, n_0+j] + c_{\tilde{p}\tilde{p}}[0,0]\sum_{i=-2}^{2}\sum_{j=-2}^{2}\beta_{i,j}$$

where, $\alpha_{ij}$ and $\beta_{ij}$ represent the change in the absorptance and absorptance standard deviation, respectively of pixel $[m_0+i, n_0+j]$. The autocorrelation function $c_{\tilde{p}\tilde{p}}$ represents the autocorrelation of a perceptually filtered error image function. The perceptually filtered error image function may be expressed as a convolution of a filter function that represents the HVS response, and a function that represents the printer dot pattern. Thus, $c_{\tilde{p}\tilde{p}}$ may be constant for a particular printer (or family of similar printers). The cross correlation function $c_{\tilde{p}\tilde{e}}$ describes the correlation of $c_{\tilde{p}\tilde{p}}$ and the initial difference image between initial predicted rendered halftone 68 and continuous-tone image 58. Thus, $c_{\bar{p}\bar{e}}$ may be fully evaluated only once for an initial digital halftone of a particular image (on a particular printer). Thus, both $c_{\bar{p}\bar{p}}$ and $c_{\bar{p}\bar{e}}$ may be stored, at least temporarily, in lookup tables. After accepting a modification of a pixel at coordinates $[m_0, n_0]$, $c_{\bar{p}\bar{e}}$ may be updated by applying the formula:

$$c'_{\bar{p}\bar{e}}[m, n] = c_{\bar{p}\bar{e}}[m, n] + \sum_{i=-2}^{2} \sum_{j=-2}^{2} \alpha_{i,j} c_{\bar{p}\bar{p}}[m - (m_0 + i), n - (n_0 + j)]$$

If the change in the evaluation criterion indicates an improvement, or more similarity (step 98), the modification of the pixel may be retained. Otherwise, the pixel may be restored to its original state (step 100).

If more pixels remain to be evaluated, another pixel (e.g. an adjacent pixel) is selected (step 104). The selected pixel is then modified and the results evaluated (repeating steps 94 through 100). When the effect of modifying all pixels (in the digital halftone or in a region of the digital halftone) has been evaluated, the digital halftone may be accepted (step 110). The accepted digital halftone may be printed or saved for later printing.

In an embodiment of method 90 for digital halftone optimization, pixels of the digital halftone may be revisited to explore whether or not additional modifications result in changes to the evaluation criterion that indicate further improvement. The results of modifying the pixels of the digital halftone may be check to see if any of the modifications to pixel values were retained (step 106). If any modifications to values of pixels of the digital halftone were retained (e.g. the results of any application of the test of step 98 were affirmative), another pass through the pixels may be made to check for further improvement. Returning to a first pixel of the current digital halftone (step 108), and the process may be repeated (repeating steps 94 through 106).

In the event that no modifications were retained after repeating the process, the current digital halftone may be accepted (step 110).

In accordance with an embodiment of the invention, a nonlinear model may be used to calculate the contribution of dots in an outer neighborhood to the absorptance of a central dot. In a nonlinear model, an additional contribution to the absorptance resulting from pairs of two adjacent dots in the outer neighborhood may be considered. A least-squares fit may be applied to determine the weights for the nonlinear contribution.

It should be understood that application of the EP modeling method described herein within a DBS algorithm represents one illustrative example of the EP modeling method may be used in digital halftoning. For example, the EP model may be applied within an error diffusion technique to yield a more accurate prediction of an error in a printed halftone resulting at each stage of the error diffusion thresholding process. The EP model may also be employed as part of a process of designing a threshold mask for use in digital halftoning by screening or dithering. Application of the EP model may enable a more accurate prediction of a printed rendered halftone that would result from a given digital halftone.

An EP halftoning model, in accordance with an embodiment of the invention, may be implemented in the form of software, hardware or a combination thereof.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

We claim:

1. A method for digital halftoning by predicting an appearance of a rendering by a printer of a digital halftone representation of a continuous-tone image, the method comprising:
   using a processor, calculating a predicted absorptance value of a dot of a rendered halftone of the digital halftone representation, the dot corresponding to a pixel of the digital halftone representation, wherein the predicted absorptance value is based on a configuration of pixel values of pixels in an immediate neighborhood of the pixel, and on a weighted contribution of a pixel value of each pixel in an outer neighborhood of the pixel; and,
   using the processor, creating a digital halftone for rendering by the printer.

2. The method of claim 1, wherein the creating of the digital halftone includes using a halftoning technique selected from a group of halftoning techniques consisting of digital binary search, designing a threshold mask for use in screening, and error diffusion.

3. The method of claim 2, wherein the halftoning technique comprises:
   providing an initial digital halftone representation of the continuous-tone image;
   selecting a pixel from a plurality of pixels in a halftone region of the initial digital halftone representation;
   for each selected pixel:
     performing the calculating of the predicted absorptance value of the dot of the rendered halftone that corresponds to the selected pixel;
     calculating an evaluation criterion value indicative of a similarity between the predicted absorptance values and corresponding continuous-tone pixel values in a corresponding region of the continuous-tone image; and
     performing an enhancement procedure including modifying the pixel values of at least one pixel of the halftone region, recalculating the predicted absorptance values, calculating a change in the evaluation criterion value, and replacing the pixel values with the modified pixel values when the calculated change in the evaluation criterion is indicative of enhanced similarity between the recalculated predicted absorptance values and the corresponding continuous-tone pixel values.

4. The method of claim 3, wherein calculating the change in the evaluation criterion value comprises calculating a term based on a statistic of variation of the predicted absorptance value.

5. The method of claim 1, wherein the immediate neighborhood is centered on the selected pixel and wherein the outer neighborhood comprises a single-pixel-wide band of pixels that surrounds the immediate neighborhood.

6. The method of claim 1, wherein a weight of said weighted contribution of a pixel value of each pixel in an outer neighborhood depends on the configuration of pixel values of pixels in the immediate neighborhood.

7. The method of claim 1, wherein a weight of said weighted contribution of a pixel value of each pixel in an outer neighborhood is generated by analysis of an image of a printed halftone that was printed by the printer, the printed halftone comprising a rendering of a plurality of replications of a plurality of configurations of an inner pattern of pixels surrounded by an outer pattern of pixels, the inner pattern being substantially identical to the immediate neighborhood, and the outer pattern being substantially identical to the outer neighborhood.

8. The method of claim 7, wherein said plurality of configurations comprises each inner pattern configuration of a set of all possible configurations of the inner pattern, each inner pattern configuration in combination with each outer pattern configuration of a set of configurations of the outer pattern, the set of configurations of the outer pattern being a subset of all possible configurations of the outer pattern.

9. The method of claim 7, wherein analysis of the image of the printed halftone comprises calculating a statistic of variation of the absorptance of a central dot of each configuration of the plurality of configurations.

10. A non-transitory computer readable medium containing instructions that when executed cause a processor to execute the step of calculating a predicted absorptance value of a dot of a rendered halftone of the digital halftone representation, the dot corresponding to a pixel of the digital halftone representation, wherein the predicted absorptance value is based on a configuration of pixel values of pixels in an immediate neighborhood of the pixel, and on a weighted contribution of a pixel value of each pixel in an outer neighborhood of the pixel.

11. The non-transitory computer readable medium of claim 10, wherein the step of calculating the predicted absorptance value is incorporated in a halftoning technique selected from a group of halftoning techniques consisting of digital binary search, screening, and error diffusion.

12. The non-transitory computer readable medium of claim 10, wherein the halftone technique comprises:
   providing an initial digital halftone representation of the continuous-tone image;
   selecting a pixel from a plurality of pixels in a halftone region of the initial digital halftone representation;
   for each selected pixel:
   performing the calculating of the predicted absorptance value of the dot of the rendered halftone that, corresponds to the selected pixel;
   calculating an evaluation criterion value indicative of a similarity between the predicted absorptance values and corresponding continuous-tone pixel values in a corresponding region of the continuous-tone image; and
   performing an enhancement procedure including modifying the pixel values of at least one pixel of the halftone region, recalculating the predicted absorptance values, calculating a change in the evaluation criterion value, and replacing the pixel values with the modified pixel values when the calculated change in the evaluation criterion is indicative of enhanced similarity between the recalculated predicted absorptance values and the corresponding continuous-tone pixel values.

13. The non-transitory computer readable medium of claim 12, wherein calculating the change in the evaluation criterion value comprises calculating a term based on a statistic of variation of the predicted absorptance value.

14. The non-transitory computer readable medium of claim 10, wherein the immediate neighborhood is centered on the selected pixel and wherein the outer neighborhood comprises a single-pixel-wide band of pixels that surrounds the immediate neighborhood.

15. The non-transitory computer readable medium of claim 10, wherein a weight of said weighted contribution of a pixel value of each pixel in an outer neighborhood depends on the configuration of pixel values of pixels in the immediate neighborhood.

16. The non-transitory computer readable medium of claim 10, wherein a weight of said weighted contribution of a pixel value of each pixel in an outer neighborhood is generated by analysis of an image of a printed halftone that was printed by the printer, the printed halftone comprising a rendering of a plurality of replications of a plurality of configurations of an inner pattern of pixels surrounded by an outer pattern of pixels, the inner pattern being substantially identical to the immediate neighborhood, and the outer pattern being substantially identical to the outer neighborhood.

17. The non-transitory computer readable medium of claim 16, wherein said plurality of configurations comprises each inner pattern configuration of a set of all possible configurations of the inner pattern, each inner pattern configuration in combination with each outer pattern configuration of a set of configurations of the outer pattern, the set of configurations of the outer pattern being a subset of all possible configurations of the outer pattern.

18. The non-transitory computer readable medium of claim 16, wherein analysis of the image of the printed halftone comprises calculating a statistic of variation of the absorptance of a central clot of each configuration of the plurality of configurations.

19. A data processing system comprising:
   a processing unit in communication with a computer readable medium, wherein the computer readable medium contains a set of instructions for enhancing a digital halftone representation of a continuous-tone image for printing by a printer, wherein the processing unit is designed to carry out a set of instructions to calculate a predicted absorptance value of a dot of a rendered halftone of the digital halftone representation, the dot corresponding to a pixel of the digital halftone representation, wherein the predicted absorptance value is based on a configuration of pixel values of pixels in an immediate neighborhood of the pixel, and on a weighted contribution of a pixel value of each pixel in an outer neighborhood of the pixel.

20. The system of claim 19, wherein the processing unit is designed to carry out instructions to perform a halftoning technique selected from a group of halftoning techniques consisting of iterative search, designing a threshold mask for use in screening, and error diffusion, the halftoning technique incorporating the calculated predicted absorptance value.

* * * * *

UNITED STATES PATENT AND TRADEMARK OFFICE
CERTIFICATE OF CORRECTION

| | | |
|---|---|---|
| PATENT NO. | : 8,537,423 B2 | Page 1 of 1 |
| APPLICATION NO. | : 13/007013 | |
| DATED | : September 17, 2013 | |
| INVENTOR(S) | : Omri Shacham et al. | |

It is certified that error appears in the above-identified patent and that said Letters Patent is hereby corrected as shown below:

In the Claims

In column 13, line 51, in Claim 12, delete "that," and insert -- that --, therefor.

Signed and Sealed this
Third Day of December, 2013

Margaret A. Focarino
*Commissioner for Patents of the United States Patent and Trademark Office*